(12) United States Patent
Magen Medina et al.

(10) Patent No.: US 12,265,616 B2
(45) Date of Patent: Apr. 1, 2025

(54) DETECT ANOMALOUS CONTAINER DEPLOYMENT AT A CONTAINER ORCHESTRATION SERVICE

(71) Applicant: Microsoft Technology Licensing, LLC., Redmond, WA (US)

(72) Inventors: Amit Magen Medina, Netanya (IL); Dotan Patrich, Kfar Saba (IL); Josef Weizman, Haifa (IL); Idan Hen, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 382 days.

(21) Appl. No.: 17/536,995

(22) Filed: Nov. 29, 2021

(65) Prior Publication Data

US 2023/0169168 A1 Jun. 1, 2023

(51) Int. Cl.
*G06F 21/56* (2013.01)
*G06N 7/01* (2023.01)
*G06N 20/00* (2019.01)

(52) U.S. Cl.
CPC .............. *G06F 21/56* (2013.01); *G06N 7/01* (2023.01); *G06N 20/00* (2019.01); *G06F 2221/034* (2013.01)

(58) Field of Classification Search
CPC .. G06F 21/56; G06F 2221/034; G06F 21/554; G06F 21/51; G06N 20/00; G06N 7/01
See application file for complete search history.

(56) References Cited

U.S. PATENT DOCUMENTS

| 10,824,726 | B1 | 11/2020 | Herman Saffar et al. |
| 2006/0284761 | A1* | 12/2006 | Picard .................. G06F 18/295 |
| | | | 342/160 |
| 2021/0157622 | A1 | 5/2021 | Ananthapur Bache et al. |
| 2022/0172037 | A1* | 6/2022 | Kang .................... G06N 3/044 |

(Continued)

FOREIGN PATENT DOCUMENTS

WO WO-9729447 A2 * 8/1997 ............. G16H 15/00

OTHER PUBLICATIONS

Tunde-Onadele, et al., "A Study on Container Vulnerability Exploit Detection", In Proceedings of IEEE International Conference on Cloud Engineering, Jun. 24, 2019, pp. 121-127.

(Continued)

*Primary Examiner* — Lesa M Kennedy
(74) *Attorney, Agent, or Firm* — Workman Nydegger

(57) ABSTRACT

A computing system is configured to detect a request for a deployment of a container at a container orchestration service. One or more datasets associated with the deployment of the container are collected, and a plurality of features associated with the deployment are extracted based on the one or more datasets. A probability score is then generated based on the plurality of features, using a machine-learning model trained on datasets associated with historical deployments of containers that have been performed via the container orchestration service. The probability score indicates a probability that the deployment of the container is anomalous compared to the historical deployments of containers. When the probability score is greater than a threshold, the deployment of the container is determined as anomalous.

15 Claims, 10 Drawing Sheets

(56) References Cited

U.S. PATENT DOCUMENTS

2023/0154332 A1* 5/2023 Nayak .............. G08G 1/096716
                                                    701/301
2023/0195497 A1* 6/2023 Ota ........................ G06F 9/455
                                                    718/1

OTHER PUBLICATIONS

"International Search Report and Written Opinion Issued in PCT Application No. PCT/US2022/048641", Mailed Date: Mar. 2, 2023, 12 Pages.

Tien, et al., "KubAnomaly: Anomaly detection for the Docker orchestration platform with neural network approaches", In Journal of Engineering Report, vol. 1, Issue 5, Dec. 12, 2019, 20 Pages.

* cited by examiner

DETECT ANOMALOUS CONTAINER DEPLOYMENT AT A CONTAINER ORCHESTRATION SERVICE

BACKGROUND

In a containers network (such as a Kubernetes® network), users deploy applications by pulling a container image from a registry. A registry is a repository containing container images (e.g., usually docker container images) that can be deployed to a containers cluster, e.g., a Kubernetes® cluster. A registry can be either private or public. While public registries are simple to use, private registries are more secure, allowing role-based access control and gate which images get pushed to the repository. As a rule of thumb, users should deploy images only from known trusted registries. However, with broader usage of open-source tools, deploying containers from public repositories has become a common and a necessity. For example, "NGINX®," a common web server in Kubernetes®, is one of the most widely deployed container images that is stored in a public repository.

There are many container images stored in public registries. Some of these images are well known, and some of these images are less known, and/or might be malicious. An inexperienced or malicious user could unintentionally or intentionally deploy a malicious container that interferes with operations of other containers.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to a computing system or a method for training and/or using one or more machine-learning models for detecting anomalous deployments of containers that are performed via a container orchestration service.

The one or more machine-learning models are trained on data associated with historical deployments of containers that have been performed via the container orchestration service. A computing system is configured to perform the training. First, the computing system is configured to obtain training data associated with a plurality of historical deployments of containers. For each of the plurality of historical deployments of containers, a plurality of features are extracted based on the training data. The computing system then selects one or more collections of features among the plurality of features. Each collection of features is a subset of the plurality of features. For each of the one or more collections of features, an anomaly detection model is trained using machine learning, such that the anomaly detection model is configured to generate a probability score for a given dataset associated with a deployment of a container, indicating a probability that the deployment of the container is anomalous compared to the plurality of historical deployments of containers.

In some embodiments, the computing system is further configured to assign a weight to each of the one or more anomaly detection models. The computing system then creates a combined anomaly detection model configured to generate an overall weighted probability score based on probability scores generated by the one or more anomaly detection models and their corresponding weights.

In some embodiments, a first anomaly detection model is trained based on first data associated with a first plurality of historical deployments, and a second anomaly detection model is trained based on second data associated with a second plurality of historical deployments. In response to receiving a dataset associated with a request for deployment of the container, the first anomaly detection model is configured to generate a first probability score, indicating a first probability that the deployment of the container is anomalous compared to the first plurality of historical deployments; and the second anomaly detection model is configured to generate a second probability score, indicating a second probability that the deployment of the container is anomalous compared to the second plurality of historical deployments. The computing system then generates a combined model configured to generate an overall score in response to receiving the dataset associated with the deployment of the container based on the first probability score and the second probability score.

The trained machine-learning model(s) can then be used for detecting anomalous deployments of containers. In some embodiments, when a request for a deployment of a container on the container network is detected, a computing system, which may or may not be the same computing system that has trained the machine-learning model(s), is configured to collect one or more datasets associated with the deployment of the container. The one or more datasets can be collected from at least one of the following sources: (1) a client device that performed the deployment, (2) a manifest file, indicating the request for the deployment of the container, (3) an audit log that records different events associated with the deployment of the container, and/or (4) a registry storing an image associated with the deployment.

Next, the computing system is configured to extract a plurality of features associated with the deployment of the container based on the one or more datasets. The machine-learning model is then used to generate a probability score based on the plurality of features. The probability score indicates a probability that the deployment of the container is anomalous compared to the historical deployments of containers. When the probability score is greater than a predetermined threshold, the computing system is configured to perform at least one of (1) generate a security alert, (2) reject the request for the deployment of the container, or (3) terminate the container that has been deployed.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

Figure 1:
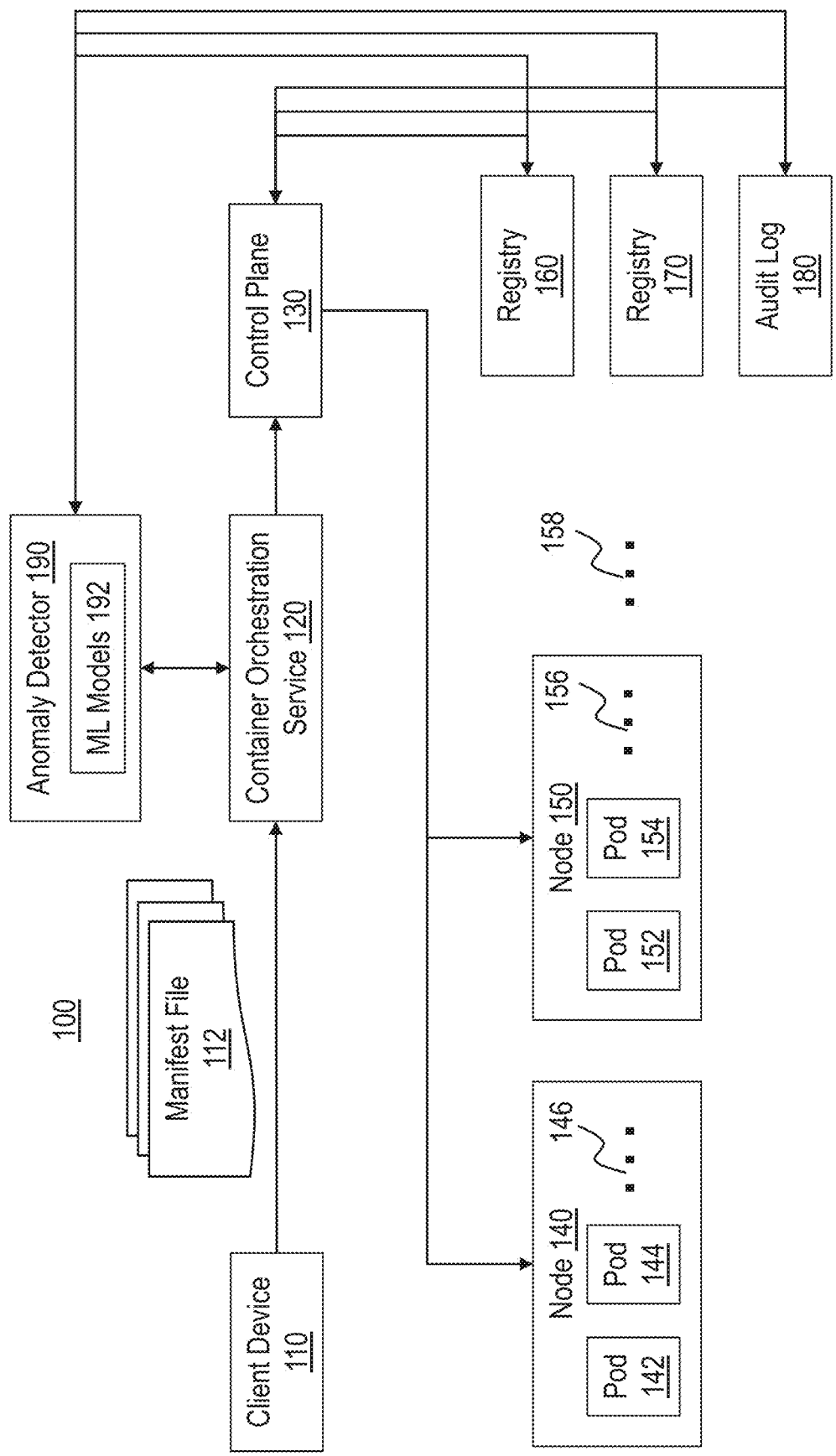
FIG. 1 illustrates an example container network that implements the principles described herein.

The embodiments described herein are related to a computing system or a method for training and/or using one or more machine-learning models for detecting anomalous deployments of containers at a container orchestration service.

A container orchestration service, such as Kubernetes®, is a service that automates deploying, running, and scaling applications running in many containers on top of many machines. For example, the container orchestration service is configured to schedule a particular container to run on a particular machine, and the container orchestration service is also configured to monitor the status of the containers, as well as scaling the deployed application.

To start a new container, an image of the container is required. The image contains all the software a machine needs to run within the container. Container images are often stored in a container registry. There are public registries, such as the public Docker® hub, or private registries, such as Azure® container registry. While public registries are simple to use, private registries are more secure, allowing role-based access control and gate which images get pushed to the repository. As a rule of thumb, users should deploy images only from known trusted sources. However, with broader usage of open-source tools, deploying containers from public repositories has become common and a necessity. There are many container images stored in registries. Some of these images are well known, and some of these images are less known, and/or might be malicious. An inexperienced or malicious user could unintentionally or intentionally deploy a malicious container that interferes with the operations of other containers.

The principles described herein solve the above problem by detecting anomalous deployments of containers at a container orchestration service, using machine-learning models trained on data associated with historical deployments of containers. The detection of anomalous deployments may be performed before or after the container is deployed. In some embodiments, in response to detecting an anomalous deployment, a security alert may be generated. In some embodiments, when the detection of the anomalous deployment is performed before the completion of the deployment, the deployment is aborted, or a request for the deployment is rejected. In some embodiments, when the detection of the anomalous deployment is performed after the completion of the deployment, the deployed container can be terminated.

As previously mentioned, a container orchestration service, such as Kubernetes®, is a service that automates deploying, running, and scaling applications running in many containers on top of many machines. In some embodiments, a basic scheduling element is called a "pod." A pod is a container that contains one or more sub-containers. When a pod contains multiple containers, these containers share a same file system and a same network namespace. In such an orchestration service, a deployment provides a layer of functionality around pods. A deployment allows a user to create one or more pods from a same definition and to perform updates to the deployed pods.

A deployment can also help with scaling applications. In some embodiments, a deployment creates a ReplicaSet, which in turn will create replica pods. A ReplicaSet is an object in the container orchestration service. The purpose of a ReplicaSet is to maintain a stable set of replica pods running at any given time. If a user performs updates on a deployment, the container orchestration service will create a new ReplicaSet that will contain the updated pods. The container orchestration service will start a few new pods, verify those are running correctly, and if so, the container orchestration service will terminate the old pods and continue this loop until new pods are running.

A typical container cluster includes a number of master nodes and a number of worker nodes. The master nodes include container a orchestration service API and a database that contains the cluster state that make up a control plane. The worker nodes are the machines that run an actual workload. The container orchestration service makes it easier to create a cluster. When a user requests for creating a container cluster, the container orchestration service sets up the master nodes automatically. The container orchestration service will then create one or more virtual machine scale sets (VMSS) in a subscription of the user and turns virtual machines (VMs) in these VMSSs into worker nodes of the container cluster. Applications can then be run on the container cluster.

Note, for an application to run on the container cluster, the application needs to be packaged as a container, wrapped in a pod, and deployed via a manifest file. For example, a user may write an application in a language of choice. The user then builds the application into a container image and store it in a registry. Next, a pod is defined in a manifest file for running the containerized application. Once the pod is defined, the pod can be deployed to the container cluster.

FIG. 1 illustrates an example container network 100 that implements the principles described herein. As illustrated in FIG. 1, a container orchestration service 120 is configured to create and maintain a cluster in the container network 100, including a control plane 130 (which includes one or more master nodes) and a plurality of worker nodes 140, 150. Each worker node 140, 150 runs one or more pods. For example, node 140 runs pods 142, 144, and node 150 runs pod 152, 154. The ellipsis 146, 156 represents that there may be any number of pods running in the node 140 or 150. The ellipsis 158 represents that there may be any number of nodes in the cluster in the container network.

A client device 110 is configured to send a manifest file 112 to the container orchestration service 120. In response to receiving the manifest file 112, the container orchestration service 120 is configured to deploy a pod on a particular node in the cluster. The particular node is configured to retrieve an image corresponding to the pod from a registry 160 or 170 based on the manifest file 112 and run the pod based on the image. There may be any number of registries. Some registries are public registries, and some registries are private registries. In some cases, the image corresponding to the pod may be stored on a public registry by another user or entity and shared with the public, e.g., open-source applications. In some cases, the image corresponding to the pod may be generated and stored on a registry (public or private) by the user of the client device 110 that requests the deployment of the pod.

In some embodiments, the container orchestration service 120 is also set up to monitor and audit certain events, such as non-repudiations. A non-repudiation is proving certain actions have been carried out by certain users, including what happened, when it happened, and who made it happen, where it happened, why it happened, and/or how it happened. The container orchestration service 120 can be set up to collect such events and/or non-repudiations from different components in the container network 100, including (but not limited to) container runtimes, control plane, and/or applications running on the cluster. The collected events can then be recorded in an audit log 180. In some embodiments, the container orchestration service 120 can deploy an agent to all nodes, and the agent is tasked to collect events and record the collected events in audit logs 180.

As shown in FIG. 1, an anomaly detector 190 is coupled to the container orchestration service 120 configured to use audit log 180 and/or data collected from other sources to detect anomalous deployments of pods using one or more machine-learning models 192. The one or more machine-learning models 192 are trained on data associated with deployments of pods and/or containers that have occurred on the container network 100. Since pods are containers that contain sub-containers, hereinafter, the term container is referred to both pods and the containers inside pods.

Figure 2:
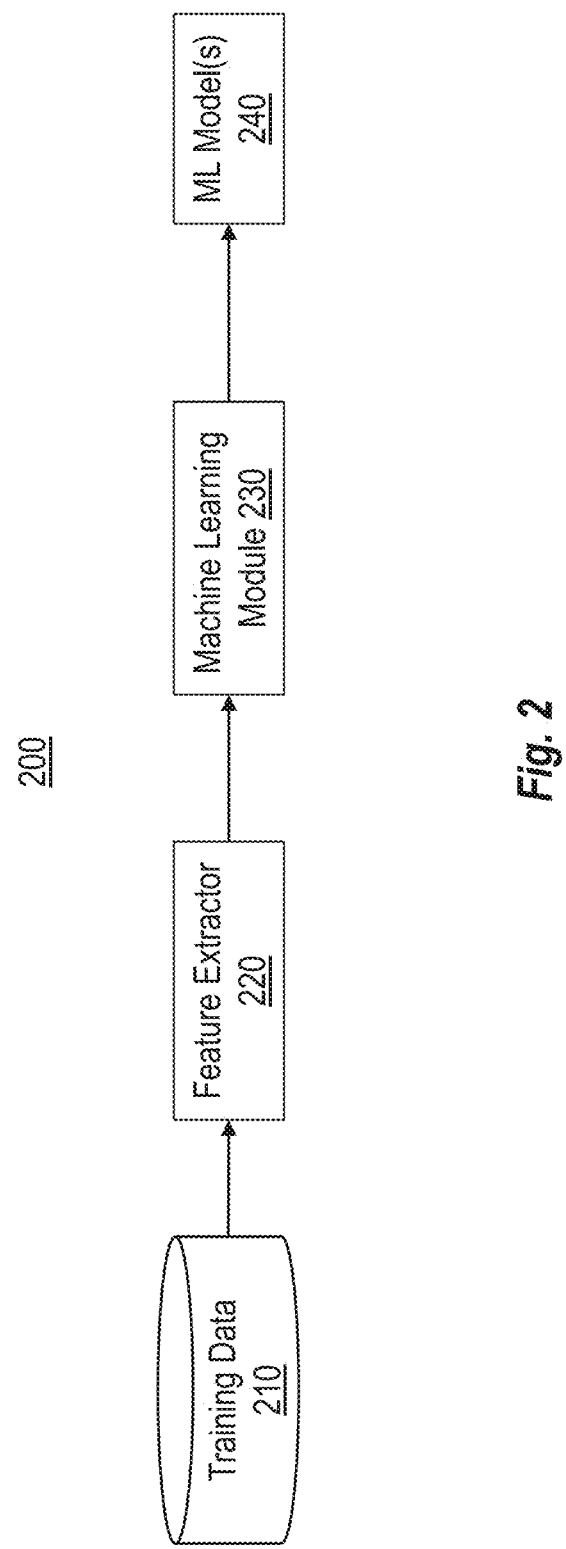
FIG. 2 illustrates an example machine-learning network configured to train one or more machine learning models for detecting anomalous deployments of containers.

FIG. 2 illustrates an example machine-learning network 200 configured to train one or more machine-learning models 240, which corresponds to the machine-learning model(s) 192 in FIG. 1. The training is performed by a computing system that may or may not be the same computing system that provides the container orchestration service 120 in FIG. 1. Training data 210 includes data associated with a plurality of historical deployments of containers that have been performed via the container orchestration service. The training data 210 is processed by a feature extractor 220 configured to extract a plurality of features. For example, for each of the plurality of historical deployments of containers, a plurality of features are extracted based on the training data.

In some embodiments, the training data associated with each historical deployment includes one or more datasets associated with at least one of (1) a client device that performed the deployment, (2) an application or workload definition file, (3) an audit log that records different events associated with the deployment of the container, or (4) an image of container stored in a registry. In some embodiments, the plurality of features includes at least one of (1) a registry account name, (2) a namespace, (3) a day of a week, (4) a time of a day, (5) an owner type, (6) a principal type, (7) a tool used to perform deployment, (8) an operating system of the client device, or (9) whether a registry account name or a namespace is first seen.

The machine learning model 230 is then configured to analyze the plurality of features to train the one or more machine-learning model(s) 240. The one or more machine-learning model(s) 240 are trained to detect anomalous deployments of containers. For example, for a given deployment of container, the one or more machine-learning model(s) 240 are configured to determine a probability that the given deployment of the container is anomalous compared to the plurality of historical deployments of containers contained in the training data 210.

In some embodiments, the machine-learning module 230 is configured to select one or more collections of features among the plurality of features. Each collection of features includes a subset of the plurality of features that are related to each other. For example, a collection of features may include (1) a registry account name and (2) a tool used to perform deployment. A user associated with a particular registry account name may have used a particular tool, e.g., a command line tool, to perform deployment in the past. When a new request for a deployment of a container is generated from the user, but using a different tool, the deployment of the container may be identified as anomalous. As another example, a user may have worked on a 9 to 5 schedule from Monday to Friday. Thus, all the historical deployment of containers generated by the user are performed during his or her working hours and days. When a new request for a deployment of a container is generated from the user at midnight on Saturday, the deployment of the container may be identified as anomalous.

In some embodiments, for each collection of features, a separate anomaly detection model is trained. As such, multiple machine-learning models are trained to detect anomalous deployments. Different machine-learning techniques may be implemented in different collections of features, depending on the relationship among the features in the collection. In some embodiments, distance-based anomaly detection techniques are used to train a model to detect a distance between the new deployment and a normal deployment. In some embodiments, clustering-based anomaly detection techniques are used to train a model to detect whether a new deployment is within one or more clusters. Many different algorithms may be used to train the models, including supervised and non-supervised training, e.g., (but not limited to) logistic regression, isolation forest, k-nearest neighbors, support vector machines (SVM), density-based algorithm, elliptic envelope, local outlier factor, Z-score, Boxplot, statistical techniques, and/or time series techniques.

In some embodiments, the computing system is further configured to assign a weight to each of the one or more anomaly detection models. The computing system then creates a combined anomaly detection model configured to generate an overall weighted probability score based on probability scores generated by the one or more anomaly detection models and their corresponding weights.

In some embodiments, a first anomaly detection model is trained based on first data associated with a first plurality of historical deployments, and a second anomaly detection model is trained based on second data associated with a second plurality of historical deployments. In response to receiving a dataset associated with a request for deployment of the container, the first anomaly detection model is configured to generate a first probability score, indicating a first probability that the deployment of the container is anomalous compared to the first plurality of historical deployments; and the second anomaly detection model is configured to generate a second probability score, indicating a second probability that the deployment of the container is anomalous compared to the second plurality of historical deployments. The computing system then generates a combined model configured to generate an overall score in response to receiving the dataset associated with the deployment of the container based on the first probability score and the second probability score.

In some embodiments, the computing system assigns a first weight to the first anomaly detection model, and assigns a second weight to the second anomaly detection model. The combined anomaly detection model is configured to generate an overall weighted probability based on the first probability score, the first weight, the second probability score, and the second weight.

In some embodiments, the first plurality of deployments of containers and the second plurality of deployments of containers are associated with different hierarchies of clusters, and the first plurality of deployments of containers is a subset of the second plurality of deployments of containers. For example, in some embodiments, the first plurality of deployment of containers are within a cluster, and the second plurality of deployments of containers are within a subscription or a tenant that includes the cluster.

Figure 3:
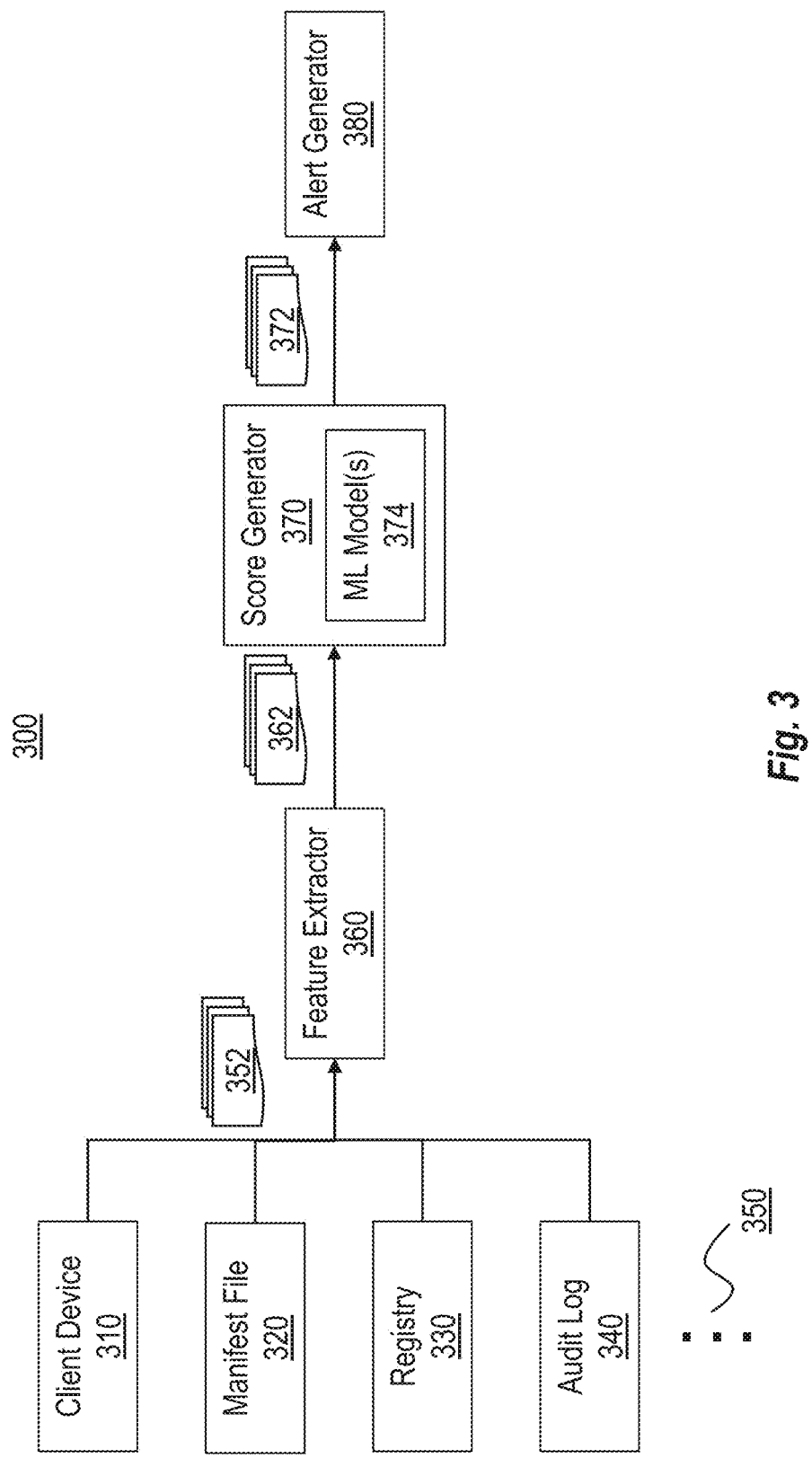
FIG. 3 illustrates an example architecture of the anomaly detector of FIG. 1.

The trained machine-learning model(s) 240 can then be used by an anomaly detector 190 for detecting anomalous deployments of containers at a container orchestration service 120. FIG. 3 illustrates an example architecture of an anomaly detector 300, which corresponds to the anomaly detector 190 in FIG. 1. As illustrated in FIG. 3, the anomaly detector 300 includes a feature extractor 360 configured to obtain one or more datasets 352 associated with a deployment of a container. The one or more datasets 352 can be obtained from at least one of (1) a client device 310 that has requested for the deployment of the container, (2) a manifest file 320, such as (but not limited to) a YAML file, (3) a registry 330 that stores an image of the container, and/or (4) an audit log 340 that records different events associated with the deployment of the container. The ellipsis 350 represents that there may be additional sources that the feature extractor 360 may obtain dataset from.

In response to receiving the one or more datasets associated with the deployment of the container, the feature extractor 360 is configured to extract a plurality of features 362 from the datasets 352. In some embodiments, the plurality of features includes at least one of (1) a registry account name, (2) a namespace, (3) a day of a week, (4) a time of a day, (5) an owner type, (6) a principal type, (7) a tool used to perform deployment, (8) an operating system of the client device, or (9) whether a registry account name or a namespace is first seen.

The extracted plurality of features 362 are then fed into a score generator 370. The score generator 370 embodies one or more machine-learning model(s) 374 that correspond to the machine-learning models 240 of FIG. 3 trained on data associated with historical deployments of containers. The one or more machine-learning model(s) 374 is configured to generate a probability score 372, indicating a probability that the deployment of container is anomalous.

The probability score 372 is then processed by an alert generator 380. In some embodiments, when the probability score 372 is greater than a predetermined threshold, the alert generator 380 is configured to generate a security alert. In some embodiments, the alert generator 380 sends the alert to the container orchestration service 120. When the container orchestration service 120 receives the alert, the deployment of the container may or may not have completed yet. In some embodiments, when the alert is generated before the deployment of the container, the container orchestration service 120 is configured to block the request for the deployment of the container. In some embodiments, when the alert is generated after the deployment of the container, the container orchestration service 120 is configured to terminate the container.

Figure 4A:
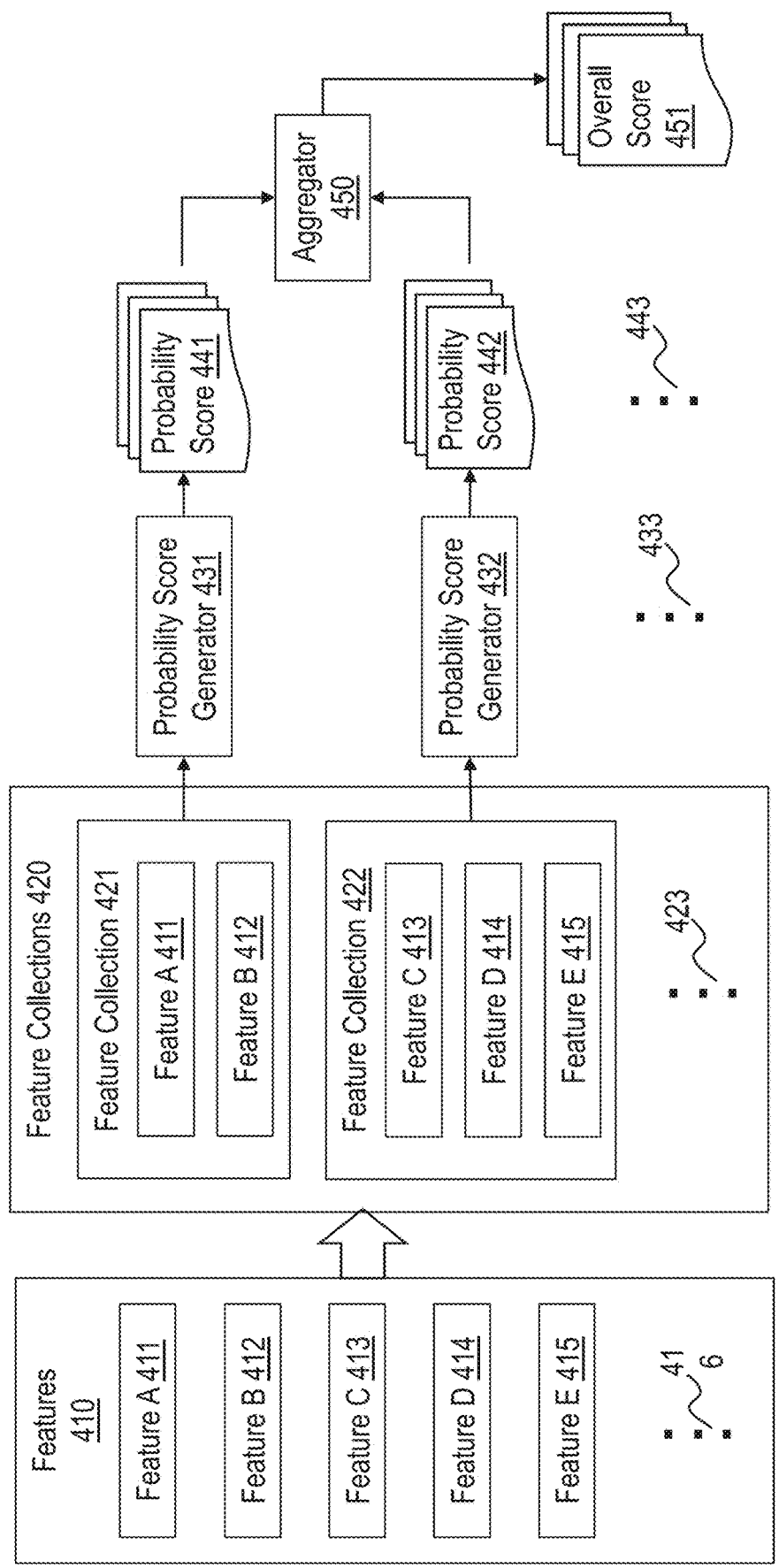
FIGS. 4A-4B illustrates example architectures of the score generator of FIG. 3.
Figure 4B:
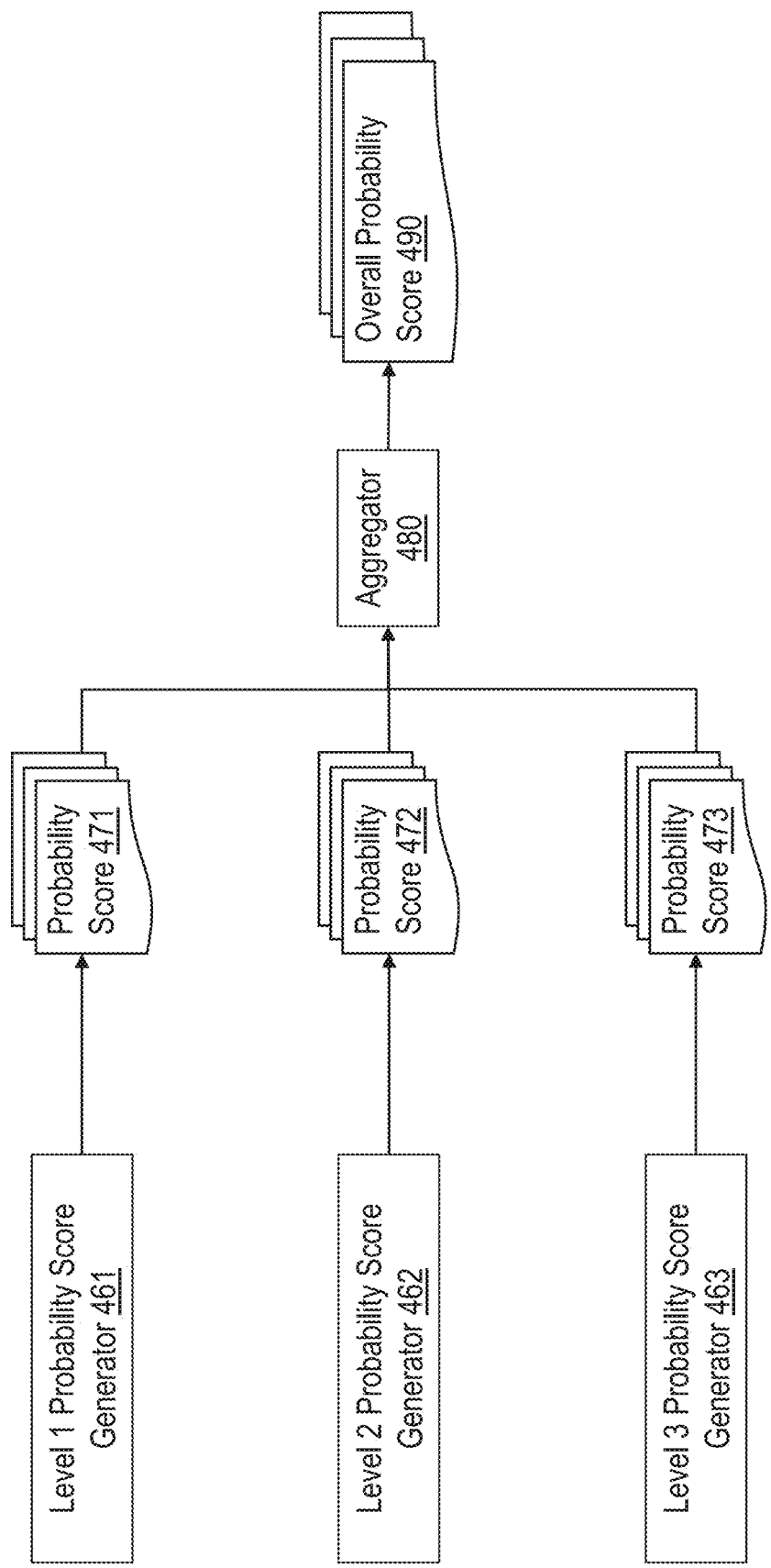

As briefly discussed above, the score generator 370 embodies one or more machine-learning model(s) 374 trained on data associated with historical deployments of containers. FIGS. 4A-4B further illustrate example architecture of the score generator 370 that implement multiple machine-learning models, each of which is configured to generate a probability score. The multiple probability scores can then be aggregated into an overall probability score.

As shown in FIG. 4A, a plurality of features 410 (which correspond to the features 362 of FIG. 3) are grouped into one or more feature collections 420. The plurality of features 410 include feature A 411, feature B 412, feature C 413, feature D 414, feature E 415, etc. The ellipsis 416 represents that there may be any natural number of features extracted from the dataset associated with historical deployments of containers. The plurality of features 410 are then grouped into one or more feature collections 420. Each feature collection (also referred to as a collection of features) includes a subset of the plurality of features 410. For example, feature collection 421 includes feature A 411 and feature B 412; and feature collection 422 includes feature C 413, feature D 414, and feature E 415. The ellipsis 423 represents that there may be any natural number of feature collections.

Each feature collection 421, 422 is then fed into a corresponding probability score generator 431, 432. The probability score generators 431, 432 embody different machine-learning models trained on the corresponding feature collections associated with the historical deployments of containers. In particular, the probability score generator 431 is configured to process the feature collection 421 (including feature A 411 and feature B 412) to generate a first probability score 441. The probability score generator 432 is configured to process the feature collection 422 (including feature C 413, feature D 414, and feature E 415) to generate a second probability score 442. The ellipsis 433 and 443 represent that there may be any number of probability score generators configured to generate different probability scores based on different feature collections.

The different probability scores 441, 442 can then be fed into an aggregator 450, which aggregates the multiple probability scores 441, 442 into an overall probability score 451. The aggregator 450 may integrate different algorithms to aggregate the multiple probability scores 441, 442. For example, in some embodiments, the aggregator identifies anomaly only when at least two probability scores indicate anomaly. In some embodiments, the aggregator 450 is configured to assign a weight to each of the different probability scores 441, 442 to generate a weighted average, and the weighted average is used as an overall probability score 451.

For example, feature A 411 may be a registry account name, and feature B 412 may be a tool used to perform the deployment. A user with the registry account name may have been using a first tool in the past. When a second tool is used in a new deployment associated with the same registry account, the probability score generator 431 may generate a first probability score 441, indicating that the new deployment is anomalous. As another example, feature C 413 may be a namespace, feature D 414 may be a day of a week, and feature E 415 may be a time of a day. A user who works on the namespace may have been working during 9 to 5 on weekdays. When a new deployment associated with the same namespace occurs at midnight on Saturday, the probability score generator 432 may generate a second probability score 442, indicating the new deployment is anomalous. The first probability score 441 and the second probability score 442 are then fed into the aggregator 450. The aggregator 450 may then generate an overall probability score 451.

In some embodiments, the one or more machine-learning models 374 include a plurality of models trained on different datasets. For example, a first machine-learning model is trained on a first set of historical data, and a second machine-learning model is trained on a second set of historical data. In some embodiments, the first set of historical data and the second set of historical data are in different hierarchies, and the first set of historical data is a subset of the second set of historical data. For example, in some embodiments, the first set of historical data is associated with historical deployments containers within a cluster, and the second set of historical data is associated with historical deployments of containers within a subscription or a tenant that includes the cluster. As such, the first machine-learning model is trained to determine whether a deployment of a container is anomalous compared to the historical deployments within the cluster, and the second machine-learning model is trained to determine whether a deployment of a container is anomalous compared to the historical deployments within the subscription or the tenant. The first probability score and the second probability score can also be integrated into an overall score, indicating an overall probability that the deployment of the container is anomalous.

FIG. 4B illustrates an example of implementing a plurality of hierarchical machine-learning models, namely, level-1 probability score generator 461, level-2 probability score generator 462, and level-3 probability score generator 463, each of which is trained on different leveled datasets. Each of the level-1 probability score generator 461, level-2 probability score generator 462, and level-3 probability score generator 463 corresponds to a machine-learning model 240 trained on data associated with historical deployments of containers, except that the level-1 probability score generator 461 is trained on level-1 data, level-2 probability score generator 462 is trained on level-2 data, and level-3 probability score generator 462 is trained on level-3 data. For example, in some embodiments, level-1 probability score generator 461 is trained on data associated with deployments of containers within a cluster, level-2 probability score generator 462 is trained on data associated with deployments of containers within a subscription, and level-3 probability score generator 463 is trained on data associated with deployments of containers with a tenant.

In some embodiments, each of level-1 probability score generator 461, level-2 probability score generator 462, and level-3 probability score generator 463 also includes multiple machine learning models as shown in FIG. 4A and an aggregator 450 configured to aggregate multiple probability scores into an overall score 451. As such, in response to receiving data associated with a new deployment of a container, level 1 probability score generator 461 is configured to generate a first overall probability score 471, indicating a probability that the new deployment is anomalous compared to the historical deployments within the cluster; level 2 probability score generator 462 is configured to generate a second overall probability score 472, indicating a probability that the new deployment is anomalous compared to the historical deployments within the subscription; and level 3 probability score generator 463 is configured to generate a third overall probability score 473, indicating a probability that the new deployment is anomalous compared to the historical deployments within the subscription.

The first overall probability score 471, the second overall probability score 472, and the third overall probability score 473 are then fed into an aggregator 480, which is configured to aggregate the scores 471, 472, 473 into an overall probability score 490. In some embodiments, the aggregator 480 assigns a weight to each of the scores 471, 472, and 473 and generates a weighted average based on the scores 471, 472, 473 and their corresponding weights. The overall probability score 490 can then be used by an alert generator 380 to determine whether the new deployment of the container is anomalous and/or whether an alert should be generated.

Notably, there are many different ways of classifying hierarchies of deployments. For example, geographical locations may also be used to classify hierarchies of deployments, as long as it satisfies the requirement that a lower-level group of deployments also belong to a higher-level group of deployments. For example, the first level training data is a subset of the second level training data, and the second level training data is a subset of the third level training data.

Figure 5:
FIG. 5 illustrates a relationship among different hierarchies of deployments of containers.

FIG. 5 illustrates a general relationship among the different hierarchies of deployments of containers. As illustrated in FIG. 5, the training data (or deployments) of first level 530 is contained in the training data (or the deployments) of second level 520, and the training data (or the deployments) of second level 520 is contained in the training data (or the deployments) of the third level 530. In a case where the first level 530 is a cluster, the second level 520 is a subscription, and the third level 510 is a tenant, the subscription needs to include the cluster, and the tenant needs to include the subscription.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
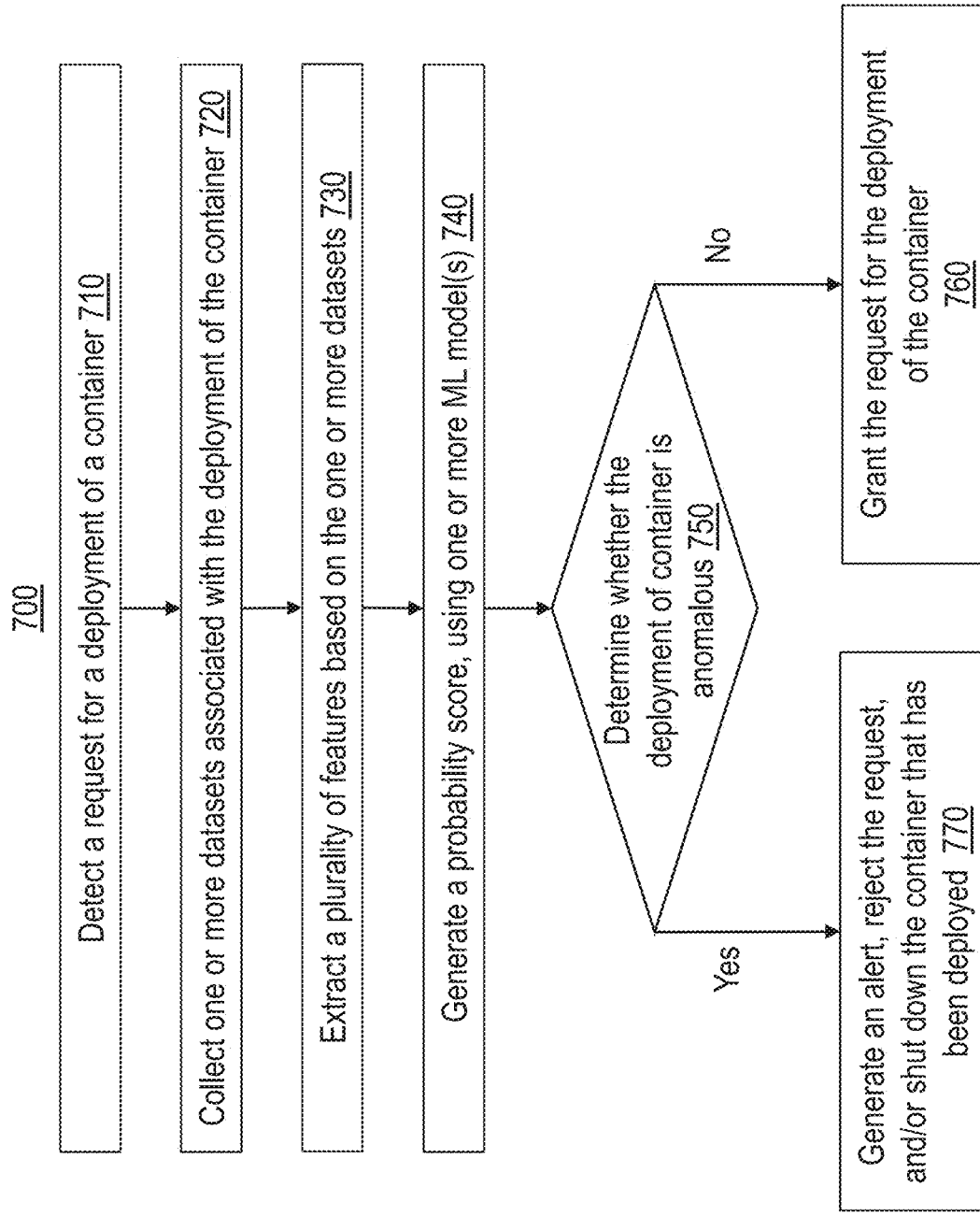
FIG. 6 illustrates a flowchart of an example method for detecting anomalous deployments of containers.

FIG. 6 illustrates a flowchart of an example method 700 of detecting an anomalous deployment of a container via a container orchestration service, using machine-learning model(s) trained on data associated with historical deployments of containers. The method 700 includes detecting a request for a deployment of a container at a container orchestration service (act 710). In some embodiments, the act 710 includes receiving a manifest file, such as (but not limited to) a YAML file, from a client device, indicating the request for the deployment of the container. The method 700 also includes collecting one or more datasets associated with the deployment of the container (act 720). In some embodiments, act 720 includes collecting a dataset from at least one of the following sources, including (but not limited to) (1) the client device that generated the request for the deployment of the container, (2) the manifest file, indicating the request for the deployment of the container, (3) an audit log that records events associated with the deployment of the container, and/or (4) a registry that stores an image of the container.

The method 700 also includes extracting a plurality of features based on the one or more datasets (act 730). In some embodiments, the plurality of features includes (but are not limited to) at least one of the following (1) a registry account name, (2) a namespace, (3) a day of a week, (4) a time of a day, (5) an owner type, (6) a principal type, (7) a tool used to perform deployment, (8) an operating system of the client device, or (9) whether a registry account name or a namespace is first seen. Thereafter, a probability score is generated based on the plurality of features, using one or more machine-learning model(s), trained on data associated with historical deployments of containers that are performed via the container orchestration service (act 740). It is then determined whether the deployment of the container is anomalous (act 750). In some embodiments, when the probability score is greater than a predetermined threshold, the deployment of the container is determined as anomalous.

In some embodiments, the acts 710-750 are performed before the deployment of the container is completed. In such a case, in response to determining that the deployment of the container is not anomalous, the request for the deployment of the container is granted (act 760); and in response to determining that the deployment of the container is anomalous, and a security alert is generated and/or the request for the deployment of the container is rejected (770). In some embodiments, the acts 710-750 are performed after the deployment of the container is completed. In such a case, in response to determining that the deployment of the container is anomalous, a security alert is generated and/or the container is caused to shut down (act 770).

Figure 7:
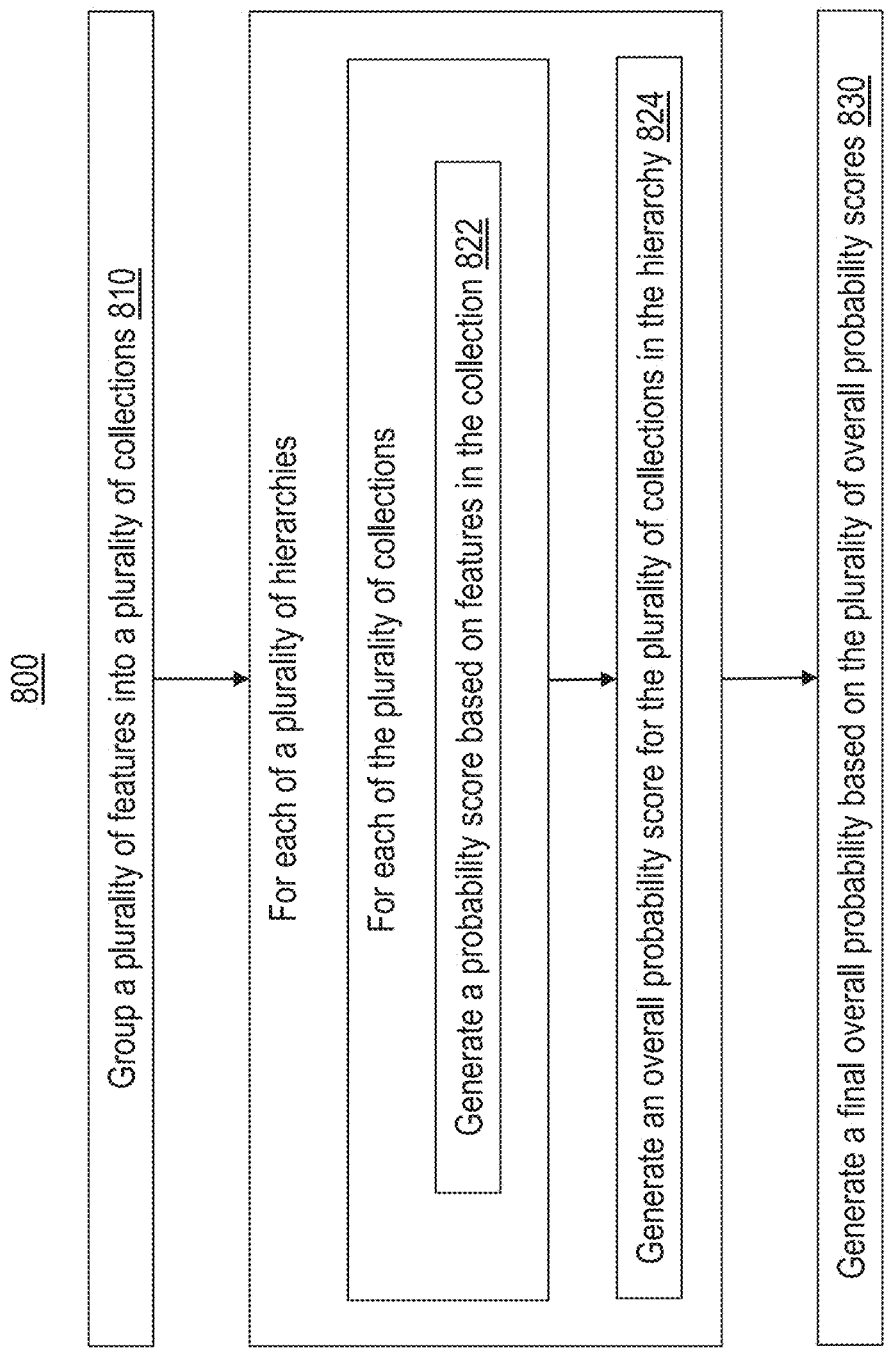
FIG. 7 illustrates a flowchart of an example method for generating a probability score, using one or more machine-learning models.

FIG. 7 illustrates a flowchart of an example method 800 for generating a probability score using one or more ML model(s), which corresponds to act 740 of FIG. 6. The method 800 includes grouping a plurality of features into a plurality of collections (act 810). Each collection includes a subset of the plurality of features. For each of a plurality of hierarchies, and for each of the plurality of collections, a probability score is generated based on the features in the collection (act 822). Notably, this is a repetitive process. For each hierarchy, a plurality of probability scores (each of which corresponds to one of the plurality of collections of features) are generated. The plurality of collections for the same hierarchy are then integrated into an overall probability score (act 824). As such, multiple overall probability scores (each of which corresponds to one of the plurality of hierarchies) are generated. The multiple overall probability scores are then integrated into a final overall probability score (act 830).

Figure 8:
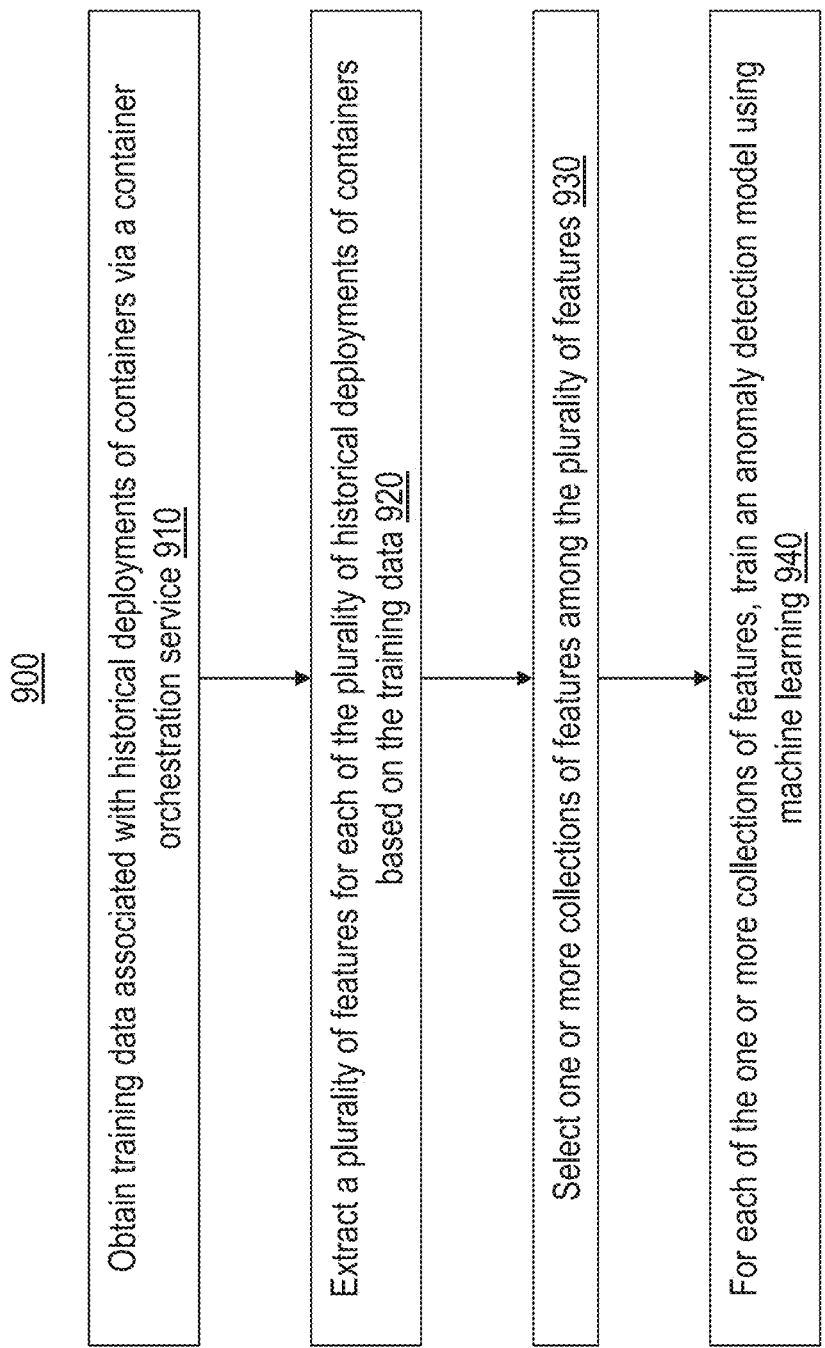
FIG. 8 illustrates a flowchart of an example method for training one or more machine-learning models using data associated with historical deployments of containers that have been performed via a container orchestration service.

FIG. 8 illustrates a flowchart of an example method for training a machine-learning model for detecting anomalous deployment of containers. The method 900 includes obtaining training data associated with historical developments of containers via container orchestration service, such as (but not limited to) Kubernetes® (act 910). The method further includes extracting a plurality of features for each of the plurality of historical deployments of containers based on the training data (act 920). Thereafter, one or more collections of features among the plurality of features are selected (act 930). Each collection of features includes a subset of the plurality of features. For each of the one or more collections of features, an anomaly detection model is trained using machine learning (act 940). Different machine-learning techniques may be implemented in different collections of features, depending on the relationship among the features in the collection. In some embodiments, distance-based anomaly detection techniques are used to train a model to detect a distance between the new deployment and a normal deployment. In some embodiments, clustering-based anomaly detection techniques are used to train a model to detect whether a new deployment is within one or more clusters. Many different algorithms may be used to train the models, including supervised and non-supervised algorithms, e.g., (but not limited to) logistic regression, isolation forest, k-nearest neighbors, support vector machines (SVM), density-based algorithm, elliptic envelope, local outlier factor, Z-score, Boxplot, statistical techniques, and/or time series techniques.

Further, as discussed above with respect to FIGS. 4A-4B, different sets of machine learning models may be trained on different-leveled training data for detecting anomalies at different levels. The different sets of machine learning models can then be integrated together to generate an overall probability score, indicating a probability that a given deployment of the container is anomalous.

Finally, because the principles described herein may be performed in the context of a computing system (for example, each of the client device 110, the container orchestration service 120, the anomaly detector 190, and node 140, 150 may include one or more computing systems) some introductory discussion of a computing system will be described with respect to FIG. 9.

Computing systems are now increasingly taking a wide variety of forms. Computing systems may, for example, be hand-held devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 9:
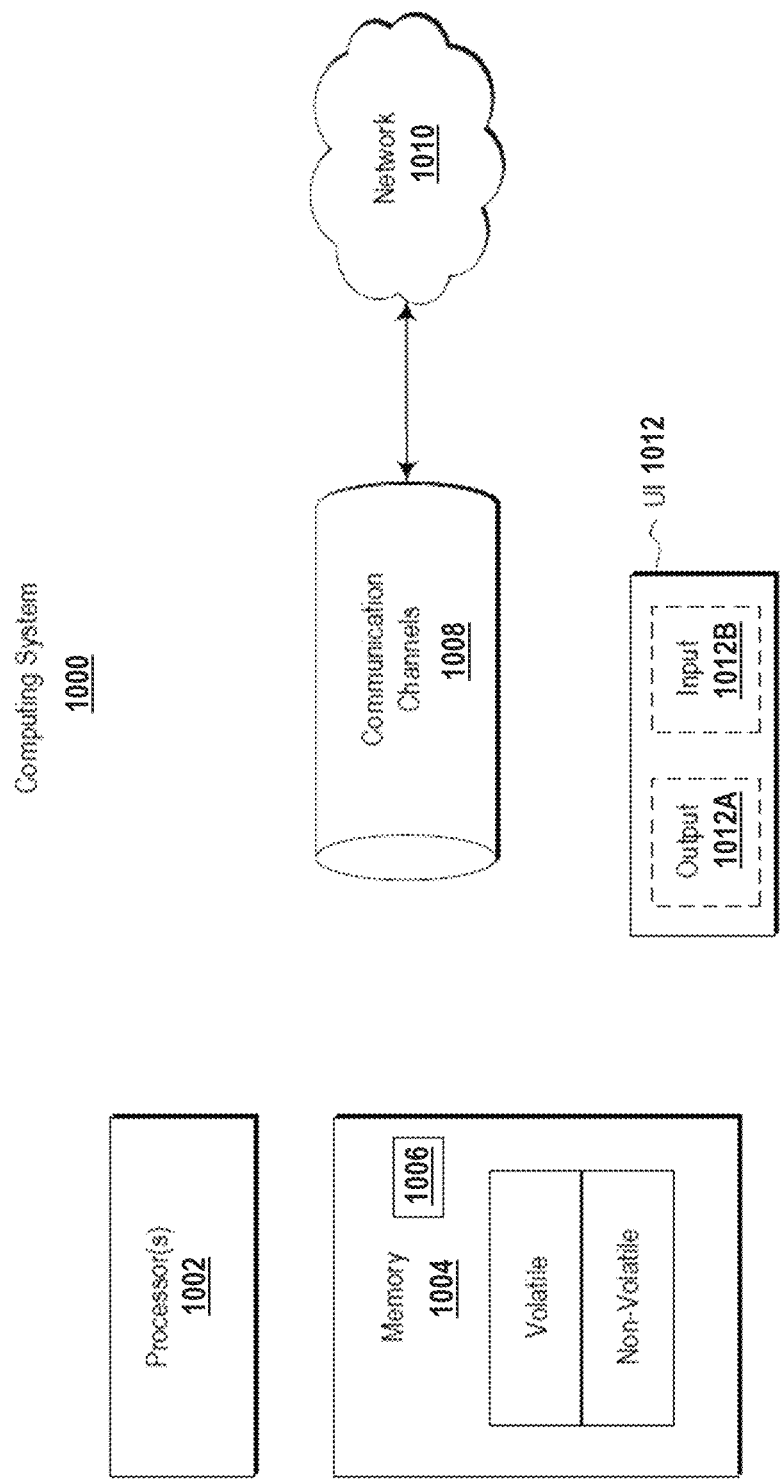
FIG. 9 illustrates an example computing system in which the principles described herein may be employed.

As illustrated in FIG. 9, in its most basic configuration, a computing system 1000 typically includes at least one hardware processing unit 1002 and memory 1004. The processing unit 1002 may include a general-purpose processor and may also include a field-programmable gate array (FPGA), an application-specific integrated circuit (ASIC), or any other specialized circuit. The memory 1004 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 1000 also has thereon multiple structures often referred to as an "executable component". For instance, memory 1004 of the computing system 1000 is illustrated as including executable component 1006. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 1004 of the computing system 1000. Computing system 1000 may also contain communication channels 1008 that allow the computing system 1000 to communicate with other computing systems over, for example, network 1010.

While not all computing systems require a user interface, in some embodiments, the computing system 1000 includes a user interface system 1012 for use in interfacing with a user. The user interface system 1012 may include output mechanisms 1012A as well as input mechanisms 1012B. The principles described herein are not limited to the precise output mechanisms 1012A or input mechanisms 1012B as such will depend on the nature of the device. However, output mechanisms 1012A might include, for instance, speakers, displays, tactile output, holograms, and so forth. Examples of input mechanisms 1012B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hard-wired, wireless, or a combination of hard-wired or wireless) to a computing system, the computing system properly views the connection as a transmission medium. Transmissions media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 1000 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 1002 and memory 1004, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
  one or more processors; and
  one or more computer-readable hardware storage devices having stored thereon computer-executable instructions that are structured such that, when executed by the one or more processors, the computer-executable instructions cause a computing system to perform at least:
    detect a request for a deployment of a container at a container orchestration service;
    collect one or more datasets associated with the deployment of the container;
    extract a plurality of features based on the one or more datasets;
    generate a probability score based on the plurality of features, using one or more machine-learning models trained on datasets associated with historical deployments of containers that have been performed via the container orchestration service, the probability score indicating a probability that the deployment of the container is anomalous compared to the historical deployments of containers;
    determine the deployment of the container is anomalous when the probability score is greater than a threshold;
    generate a first probability score based on the plurality of features, using a first machine learning model trained on a first set of historical data;
    generate a second probability score based on the plurality of features, using a second machine learning model trained on a second set of historical data;
      wherein the first set of historical data and the second set of historical data are in different hierarchies, and the first set of historical data is a subset of the second set of historical data;
      wherein the first set of historical data is associated with historical deployments of containers within a cluster and the second set of historical data is associated with historical deployments of containers within a subscription or a tenant that includes the cluster;
    generate an overall score based on the first probability score and the second probability score,
    wherein generating the overall score includes:
      assigning a first weight to the first probability score;
      assigning a second weight to the second probability score; and
      generating a weighted overall probability score based on the first probability score, the first weight, the second probability score, and the second weight; and
    in response to determining that the overall score is greater than a predetermined threshold, performing at least one of (1) generate a security alert, (2) reject the request for the deployment of the container, or (3) terminate the container that has been deployed.

2. The computing system of claim 1, wherein the computing system is further configured to:
  in response to determining that the deployment of the container is anomalous, perform at least one of (1) generate a security alert, (2) block the request of the deployment of the container, or (3) terminate the container that has been deployed.

3. The computing system of claim 1, wherein detecting the request for the deployment of the container comprises receiving a manifest file from a client device, indicating the request for the deployment of the container.

4. The computing system of claim 3, wherein collecting one or more datasets includes collecting a dataset from at least one of (1) the client device, (2) the manifest file, (3) an audit log that records different events associated with the deployment of the container, or (4) a registry that stores an image of the container.

5. The computing system of claim 4, wherein the plurality of features includes at least one of (1) a registry account name, (2) a namespace, (3) a day of a week, (4) a time of a day, (5) an owner type, (6) a principal type, (7) a tool used to perform deployment, (8) an operating system of the client device, or (9) whether a registry account name or a namespace is first seen.

6. The computing system of claim 1, the computing system further configured to:
 group the plurality of features into a plurality of collections of features;
 for each of the plurality of collections of features, generate a probability score, using a machine-learning model trained on the dataset associated with the historical deployments of containers that are performed via the container orchestration service, the probability score indicating a probability that the deployment of the container is an anomaly;
 generate a second overall score based on the plurality of probability scores; and
 in response to determining the second overall score is greater than a predetermined threshold, perform at least one of (1) generate a security alert, (2) reject the request for the deployment of the container, or (3) terminate the container that has been deployed.

7. The computing system of claim 6, wherein generating the second overall score based on the plurality of probability scores includes:
 assigning a weight to each of the plurality of probability scores; and
 generating a weighted overall score based on the plurality of probability scores and the corresponding weights.

8. A method implemented at a computing system for detecting anomalous deployments of containers on a container network, the method comprising:
 detecting a request for a deployment of a container at a container orchestration service;
 collecting one or more datasets associated with the deployment of the container;
 extracting a plurality of features based on the one or more datasets;
 generating a probability score based on the plurality of features, using a machine-learning model trained on datasets associated with historical deployments of containers that have been performed via the container orchestration service, the probability score indicating a probability that the deployment of the container is anomalous compared to the historical deployments of containers;
 determining the deployment of the container is anomalous when the probability score is greater than a threshold;
 generating a first probability score based on the plurality of features, using a first machine learning model trained on a first set of historical data;
 generating a second probability score based on the plurality of features, using a second machine learning model trained on a second set of historical data;
 wherein the first set of historical data and the second set of historical data are in different hierarchies, and the first set of historical data is a subset of the second set of historical data;
 wherein the first set of historical data is associated with historical deployments of containers within a cluster and the second set of historical data is associated with historical deployments of containers within a subscription or a tenant that includes the cluster;
 generating an overall score based on the first probability score and the second probability score,
 wherein generating the overall score includes:
  assigning a first weight to the first probability score;
  assigning a second weight to the second probability score; and
  generating a weighted overall probability score based on the first probability score, the first weight, the second probability score, and the second weight; and
 in response to determining that the overall score is greater than a predetermined threshold, performing at least one of (1) generating a security alert, (2) rejecting the request for the deployment of the container, or (3) terminating the container that has been deployed.

9. The method of claim 8, further comprising:
 in response to determining that the deployment of the container is anomalous, performing at least one of (1) generating a security alert, (2) blocking the request of the deployment of the container, or (3) terminating the container that has been deployed.

10. The method of claim 8, wherein detecting the request for the deployment of the container comprises receiving a manifest file from a client device, indicating the request for the deployment of the container.

11. The method of claim 10, wherein collecting one or more datasets includes collecting a dataset from at least one of (1) the client device, (2) the manifest file, (3) an audit log that records different events associated with the deployment of the container, or (4) a registry that stores an image of the container.

12. The method of claim 11, wherein the plurality of features includes at least one of (1) a registry account name, (2) a namespace, (3) a day of a week, (4) a time of a day, (5) an owner type, (6) a principal type, (7) a tool used to perform deployment, (8) an operating system of the client device, or (9) whether a registry account name or a namespace is first seen.

13. The method of claim 8, further comprising:
 grouping the plurality of features into a plurality of collections of features;
 for each of the plurality of collections of features, generating a probability score, using a machine-learning model trained on the dataset associated with the historical deployments of containers that are performed via the container orchestration service, the probability score indicating a probability that the deployment of the container is an anomaly;
 generating a second overall score based on the plurality of probability scores; and
 in response to determining the second overall score is greater than a predetermined threshold, performing at least one of (1) generating a security alert, (2) rejecting the request for the deployment of the container, or (3) terminating the container that has been deployed.

14. The method of claim 13, wherein generating the second overall score based on the plurality of probability scores includes:
- assigning a weight to each of the plurality of probability scores; and
- generating a weighted overall score based on the plurality of probability scores and the corresponding weights.

15. A computer-readable hardware storage device having stored thereon computer-executable instructions that are structured such that, when executed by one or more processors, the computer-executable instructions cause a computing system to perform at least:
- detecting a request for a deployment of a container at a container orchestration service;
- collecting one or more datasets associated with the deployment of the container;
- extracting a plurality of features based on the one or more datasets;
- generating a probability score based on the plurality of features, using one or more machine-learning models trained on datasets associated with historical deployments of containers that have been performed via the container orchestration service, the probability score indicating a probability that the deployment of the container is anomalous compared to the historical deployments of containers;
- determining the deployment of the container is anomalous when the probability score is greater than a threshold;
- generating a first probability score based on the plurality of features, using a first machine learning model trained on a first set of historical data;
- generating a second probability score based on the plurality of features, using a second machine learning model trained on a second set of historical data;
- wherein the first set of historical data and the second set of historical data are in different hierarchies, and the first set of historical data is a subset of the second set of historical data;
- wherein the first set of historical data is associated with historical deployments of containers within a cluster and the second set of historical data is associated with historical deployments of containers within a subscription or a tenant that includes the cluster;
- generating an overall score based on the first probability score and the second probability score,
- wherein generating the overall score includes:
  - assigning a first weight to the first probability score;
  - assigning a second weight to the second probability score; and
  - generating a weighted overall probability score based on the first probability score, the first weight, the second probability score, and the second weight; and
- in response to determining that the overall score is greater than a predetermined threshold, performing at least one of (1) generating a security alert, (2) rejecting the request for the deployment of the container, or (3) terminating the container that has been deployed.

* * * * *